Figure 1:
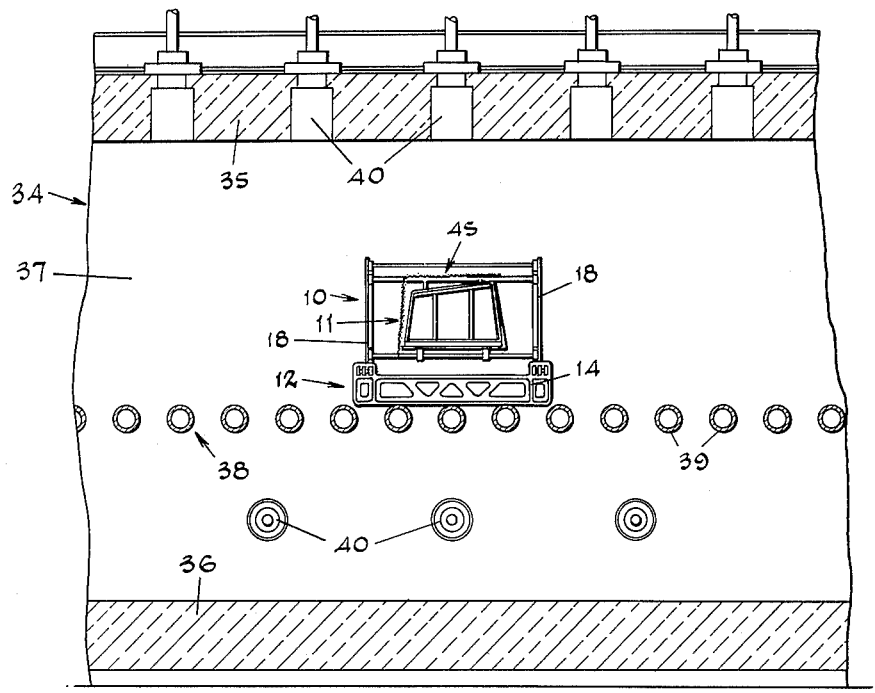

Feb. 22, 1966   R. D. CASWALL, JR., ET AL   3,236,621
APPARATUS FOR BENDING AND TEMPERING GLASS SHEETS
Filed Sept. 4, 1962   3 Sheets-Sheet 1

INVENTORS
Robert D. Caswall, Jr.
BY and Frank J. Carson
Hobbe & Swope
ATTORNEYS

INVENTORS
Robert D. Caswall, Jr.
BY and Frank J. Carson
Robbe & Swope
ATTORNEYS

Feb. 22, 1966 R. D. CASWALL, JR., ET AL 3,236,621
APPARATUS FOR BENDING AND TEMPERING GLASS SHEETS
Filed Sept. 4, 1962 3 Sheets-Sheet 3

INVENTORS
Robert D. Caswall, Jr.
BY and Frank J. Carson

Hobbe & Swope
ATTORNEYS

United States Patent Office 3,236,621
Patented Feb. 22, 1966

3,236,621
APPARATUS FOR BENDING AND TEMPERING GLASS SHEETS
Robert D. Caswall, Jr., Erie, Mich., and Frank J. Carson, Toledo, Ohio, assignors to Libbey-Owens-Ford Glass Company
Filed Sept. 4, 1962, Ser. No. 221,189
9 Claims. (Cl. 65—288)

This invention relates generally to the bending and tempering of sheets or plates of glass and, more particularly, to a novel apparatus for producing curved, tempered glass sheets for use as glazing closures.

The use of curved glass sheets as windows in automobiles or other vehicles has become more and more popular throughout the years primarily because their use permits a design wherein the windows blend pleasingly into the over-all configuration and design of the vehicle. When used for these purposes, however, it will be appreciated that the curved glass sheets must meet several requirements. First, when bent, the curvature of the sheets must be within the tolerances set by the dimensions of the openings which the sheets are to close and by the over-all configuration or outline of these openings. Secondly, the curved glass sheets must meet certain optical requirements in that they must be substantially free of any surface defects or distortions which would interfere with clear vision through the window of the vehicle. Finally, the curved sheets must be properly tempered to increase their mechanical strength rendering them more rugged and resistant to breakage.

The conventional commercial procedure for bending and tempering glass sheets intended for use as glazing closures involves the use of a bending and tempering apparatus including a bending mold having shaping surfaces conforming in curvature to the glass sheet when bent. Broadly stated, the bending and tempering procedure includes supporting a flat glass sheet on the mold with the major portion of the sheet being above shaping surfaces formed thereon followed by heating the sheet while thus supported to a temperature corresponding to the softening point of glass thereby permitting the sheet to sag under the influence of its own weight against the shaping surfaces. After the sheet is thus bent, it is subjected to a cooling atmosphere which reduces the temperature in a controlled manner to produce the desired stress pattern in the sheet.

In the above-described procedure, it will be appreciated that the degree of softening of glass and thus the tendency for a glass sheet to bend are dependent upon the temperature to which the glass is heated and, therefore, it follows that if the temperature is not the same throughout all areas of a glass sheet, all areas will not bend at the same rate and to the same curvature. As is well known if the curves of the bent areas of a glass sheet are not uniform, optical distortion results rendering the sheet less suitable for glazing purposes. In a similar manner, the degree to which a glass sheet is tempered is also dependent to some extent upon the temperature to which it is heated before being chilled and, therefore, in order for the sheet to be uniformly tempered, it is important that it be heated to a uniform temperature throughout.

A general object of the present invention is to provide a novel bending apparatus of the above character which promotes even heating of the glass sheets.

Another object is to accomplish the foregoing without interfering in any way with the bending and/or tempering of the glass sheets.

The invention also resides in the novel construction of a bending apparatus incorporating heat absorbing means constructed and mounted so as to promote even heating of the glass sheets while at the same time being disposed in an out-of-the-way position and offering no interference to the heating, bending or tempering of the sheets.

Other objects and advantages of the invention will become more apparent during the course of the following description when taken in connection with the accompanying drawings.

Figure 2:
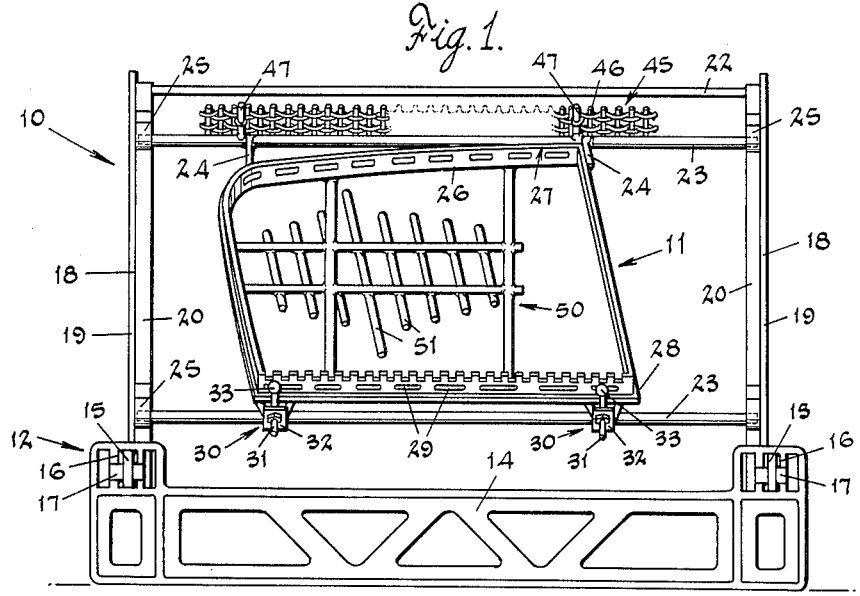
Figures 3, 4:
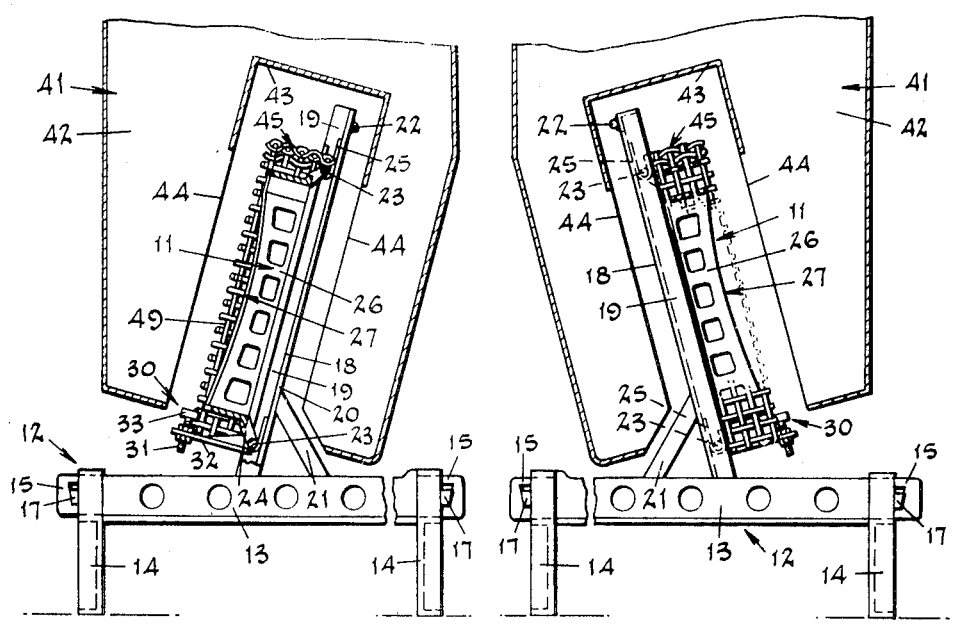
Figure 5:
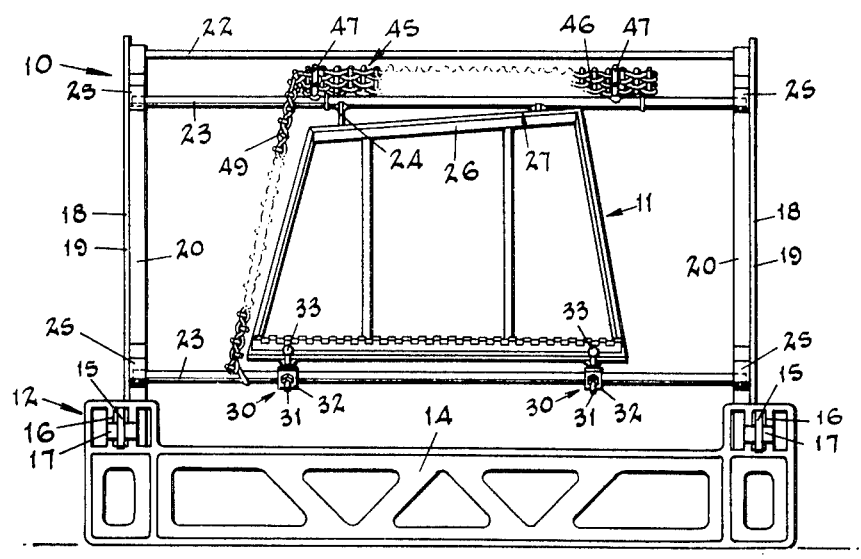
Figures 6, 7:
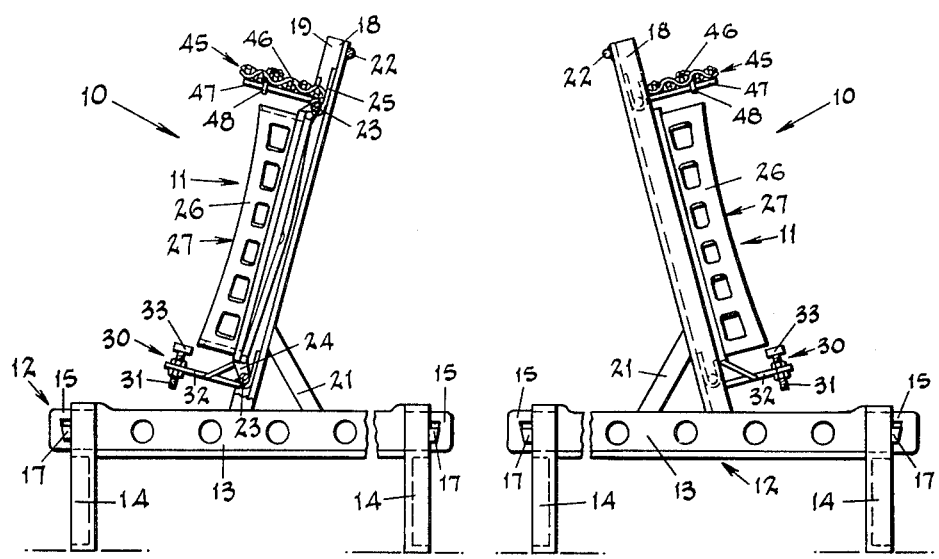
Figure 8:
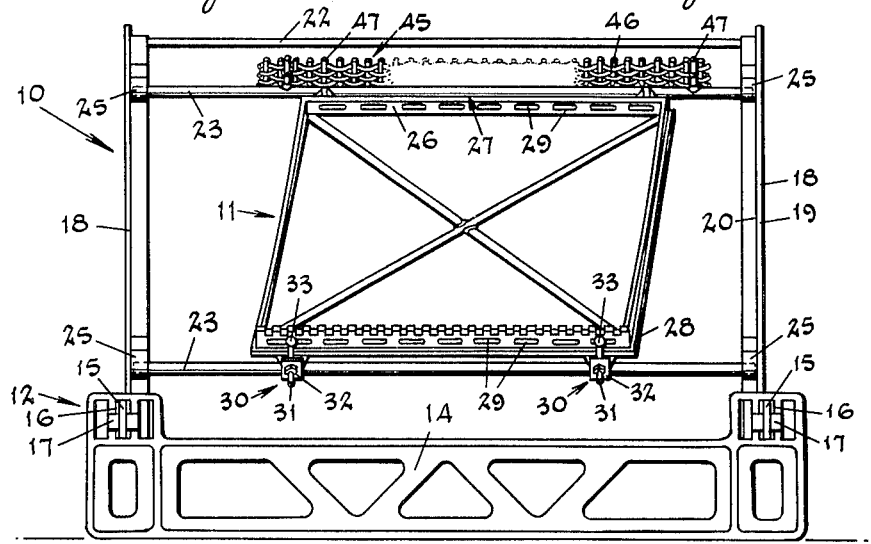
Figure 9:
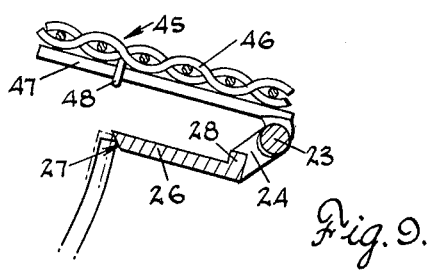

In the drawings, wherein like numerals are employed to designate like parts throughout the same:
FIG. 1 is a fragmentary longitudinal cross sectional view of a bending furnace;
FIG. 2 is an end view of a bending apparatus constructed in accordance with the present invention;
FIG. 3 is a fragmentary sectional view of a bending mold constructed in accordance with the present invention;
FIG. 4 is a side view of a bending mold supported on a rack and showing the blast heads in cross section;
FIG. 5 is an end view of a bending mold supported on a rack and having a heat absorbing member adjacent the top and leading sides of the mold;
FIG. 6 is a sectionalized side view of the bending apparatus of the present invention;
FIG. 7 is a side view of the apparatus shown in FIG. 6;
FIG. 8 is an end view of a modified form of the bending apparatus of the present invention; and,
FIG. 9 is an enlarged fragmentary sectional view of a portion of the present apparatus.

Referring now to the drawings, the conventional bending apparatus 10 includes a mold 11 mounted on a rack 12, comprising parallel side rails 13 carried at their opposite ends by upstanding end members 14 of generally rectangular shape. Extensions 15 integral with the opposite ends of each of the side rails 13 protrude through spaced openings 16 provided in the upper ends of the end members 14 and are secured in the opening by latching means such as tapered keys 17 extending through holes in the extensions 15 and wedged against the outer surface of the end sections.

Due to the rather stringent optical requirements for glass sheets intended for use as glazing closures, care must be exercised to maintain the viewing areas of the sheets free from mars or surface defects. For this purpose, to insure a minimum area of contact between the sheets and the bending mold 11, a ring type or peripheral mold having shaping surfaces which conform in outline as well as curvature to the sheets when bent and thus contact only the marginal edge portions of the sheets is commonly used. Naturally, with such a mold there is no support contacting the central or viewing areas of the glass while the sheet is at an elevated temperature and in a softened condition and, therefore, most susceptible to being marred or scratched.

With a ring type mold of the general type described, since the sheets are unsupported except at their marginal edge portions, there is a definite tendency for the sheets to over-bend or sag between the shaping surfaces whereby the central portions of the bent sheet will have a greater curvature than the marginal edge portions which rest on the mold. Of course, the obvious disadvantage of overbending is that the finished sheet will not blend into its surroundings in the manner intended by the designer. Aside from this, however, there are further disadvantages, one being that the overbending causes objects viewed through the bent sheet to appear distorted. Another disadvantage, perhaps the most serious, is that overbending changes the outline dimensions of the finished sheet, which dimensions are usually rather closely defined by the dimensions of the opening in which the finished bent sheet is to be mounted.

The problem of overbending is aggravated when the sheets are tempered in addition to being bent. To elaborate, in some instances a sheet will sag into conformity with the shaping surfaces on the mold at a temperature which is below the desired tempering temperature. When this occurs, in order to produce an acceptable temper in the sheets, their temperature is brought up to the desired tempering point while they are supported on the mold and this may result in additional sagging or overbending between the shaping surfaces.

In order to reduce this tendency toward overbending, the shaping surfaces of the mold are adapted to support the glass sheets in an inclined plane whereby the force of gravity acting against the sheet is of less magnitude in a direction normal to the sheet. This permits the glass sheet to be subjected to higher temperatures for longer periods of time than is possible when the sheet is supported by the shaping surfaces in a substantially horizontal position.

To these ends, as illustrated in the drawings, the mold 11 is disposed in an inclined plane and is carried by the rack 12 through the medium of support members 18 inclined upwardly from each side rail 13 to extend along opposite sides of the mold with their lower ends fixed to the side rails. Herein, each support member 18 comprises an angle iron mounted on the side rail 13 with one flange 19 substantially parallel to the plane of the side rail and the other flange 20 extending inwardly toward the mold. Each support member 18 is braced in its inclined position by an oppositely inclined strut 21 extending between the member and the side rail 13. The uppermost ends of oppositely disposed support members 18 are tied together by a rod 22 spanning the members with its opposite ends fixed thereto as by welding thereby to form, together with the rack 12, a unitary structure adapted to support the mold 11 in the desired manner. The mold 11 is mounted on the support members 18 by means of rods 23 fixed to the mold and extending between the support members. In the present instance, two parallel rods are utilized; one being adjacent the upper side of the mold and the other adjacent the lower side and being fixed to the mold by lugs 24. In order to enable easy removal and replacement of the mold 11 on the rack 12, the opposite ends of the rods 23 rest on the inwardly directed flanges 20 of the support members 18 and are held in place by upwardly opening hooks fixed to the flanges and adapted to receive the ends of the rods.

The ring type mold 11 usually utilized comprises an open framework of shaping rails 26 formed from relatively thin plates having shaping surfaces 27 formed on their outer edges and an integral, laterally extending flange 28 formed on their inner edges to add rigidity to the mold. The shaping rails 26 are arranged in a closed configuration conforming in outline to the sheets to be bent. It will be appreciated that the outline of the sheets may vary and is determined more or less by the design of the vehicle and the opening in which the sheet is to be subsequently mounted. Three different outline shapes for the molds are shown in the drawings for purposes of illustration only and it is emphasized that the features of the present invention are in no way affected by the outline shape of the sheet to be bent.

The shaping surfaces 27 on the mold 11 conform in curvature to the desired curvature which the bent sheets are to assume and as mentioned above support the sheets at their marginal edges. Preferably, spaced holes or slots 29 are provided in the rails 26 below the shaping surfaces 27 to allow circulation of air past the lower surface of the sheet supported on the mold. Proper positioning of the sheets of glass relative to the shaping surfaces 27 is accomplished through the medium of adjustable locating means 30 disposed adjacent the lower side of the mold. Herein, the locating means 30 comprises bolts 31 threaded into brackets 32 secured to the lowermost rod 23 spanning the support members with the head 33 of the bolt disposed transversely to a plane defined by the shaping surfaces thereby to engage the lower edge of a glass sheet carried by the mold. The bolts 31 may be threaded toward or away from the adjacent shaping surface to adjust the position of the glass sheets relative to the shaping rails of the mold.

If the finished curved sheet is intended for use in an application in which one or more of its edges will be exposed when the sheet is mounted, naturally any marring of this edge resulting from contact between the edge and its corresponding shaping surface would be objectionable. An example of such an application would be the use of the bent sheet as a sidelight of an automobile or the like which is usually mounted to move between open and closed positions. When assembled on the automobile, the bottom edge of the sidelight is disposed within the door or body of the automobile and the side edges ride in a channel and thus are hidden from view. While the mars or surface defects caused by the mold are of little importance on these concealed edges, they would, of course, be readily noticeable on the exposed upper edge of the sidelight. To avoid any such defects in the finished sheet, the shaping surface adapted to support the exposed edge during bending is designed to present a minimal area of contact between the surface and the edge of the glass sheet. To this end, this shaping surface 27 is inclined or beveled outwardly at an angle whereby only the corner of the edge of the sheet engages the surface as it is bent as shown in FIG. 9.

As brought out above, in the commercial bending and tempering of curved glass sheets, a continuous type procedure is utilized. In other words, the mold supporting a glass sheet is moved along a path through a heated atmosphere and through the cooling means which provides the desired tempering. By providing contiguous heating and chilling means and by moving the molds emerging from the heating means directly through the the chilling means, several advantages are realized. First, the heat required for bending the glass is used for tempering the glass; no reheating is required after the bending operation. Secondly, by having the same mold support the glass through both operations, less handling is required and, therefore, less marring of the sheet occurs.

The conventional means for heating the glass sheets is a tunnel type furnace 34 comprising, generally, a roof 35, a floor 36 and side walls 37 defining an elongated heating chamber. The mold 11 supporting the glass sheet is introduced into the heating chamber at one end thereof and passes through the chamber to the opposite end and the sheet is heated to the desired elevated temperatures during this passage. The mold 11 is moved through the furnace 34 on a conveyor 38 usually spaced above the floor 36 of the furnace as illustrated in FIG. 1. The conveyor 38 may comprise a plurality of parallelly spaced rollers 39 extending transversely across the heating chamber with their opposite ends journaled in the side walls 37 of the furnace 34. The rollers 39 may be power driven in any suitable manner to move the rack and the mold carried thereby throughout the entire length of the furnace.

Heating means 40, such as the gas burners illustrated in FIG. 1, are provided in the furnace 34 to raise the temperature of the atmosphere in the heating chamber to the desired point. Usually, to lessen the thermal shock to the glass sheets moved through the furnace, the heating means are controlled so that the temperature is increased relatively slowly from the entrance end of the furnace to the maximum temperature desired at a point intermediate the ends of the furnace. The heating means or burners 40 are spaced longitudinally along and transversely across the roof 35 of the furnace and project through the roof to direct heat into the heated chamber. In addition to the burners muonted in the roof of the furnace, usually additional burners are mounted in the side walls 37 below the conveyor 38. As brought out above, suitable control means (not shown) are provided to enable controlling the temperature of the heated chamber both longitudinally along and transversely across the chamber.

After the sheets have been heated to an elevated temperature during their passage through the heating chamber of the furnace 34 and upon reaching the exit end of this chamber, their temperature is rapidly reduced to temper the glass. The process of tempering glass may be broadly defined as heating the sheet to a temperature near its softening point and thereafter rapidly chilling the sheet whereby the exterior surfaces thereof cool faster than the interior of the sheet resulting in the exterior surfaces being under a compressive stress. As is well known, tempering glass not only increases its mechanical strength but also improves its breaking characteristics. When a tempered sheet is broken, the glass disintegrates into many small, relatively harmless pieces rather than into the large, irregular shaped, dangerous pieces resulting when ordinary, untreated glass is broken.

One process for tempering glass is to subject the surfaces thereof to blasts of relatively cool air. This may be conveniently carried out through the medium of blast heads 41 disposed adjacent the exit end of the furnace 34 and above the conveyor 38 on which the bending apparatus is carried. While the blast heads 41 may be of various constructions, in the present instance, as shown in the drawings, they include a plenum chamber 42 having inclined passageways 43 formed therein at an angle corresponding to the angle at which the mold 11 is carried by the rack 12. Opposed nozzles 44 disposed along each side of the passageway direct air from the plenum chamber 42 inwardly against the opposite surfaces of the sheet resting on the mold.

Regardless of the control provided for the burners, it will be appreciated that the atmosphere in the heating chamber of the furnace 34 is not at the same temperature throughout. Due partly to the fact that the majority of heat is introduced through the ceiling of the furnace and to the natural tendency for the heated air to rise, the temperature of the atmosphere increases progressively from the floor 36 to the roof 35 of the furnace 34. Since the mold 11 is supported on the rack 12 at an inclined position, the uppermost regions of the mold pass through a warmer atmosphere than do the lowermost regions. This, of course, results in the upper areas of the sheet being heated to a higher temperature than the lower areas. In addition, since the temperature of the atmosphere in the heating chamber increases progressively from the entrance end of the furnace to the exit end, the leading edge of the mold 11 and the sheet supported thereon is heated at a faster rate than the trailing edge of the sheet.

These inherent characteristics of a tunnel type furnace result in uneven heating of the sheet and, as has been brought out, this is a distinct disadvantage since the tendency for the sheet to soften and bend as well as the tendency for the sheet to temper is dependent upon the temperature to which the sheet is heated. Thus, to obtain a uniform bend free of distortion and to obtain uniform tempering, it is desirable that the sheet be heated to a uniform temperature throughout.

To this end, the present invention contemplates a novel bending apparatus having, incorporated therewith, means to promote even heating of the glass sheets by compensating for the temperature gradient present in conventional bending and tempering furnaces. In accordance with this invention, this means to promote even heating of the glass sheets is relatively simple and inexpensive and is so constructed as not to interfere in any way with the tempering procedure. Broadly stated, the foregoing aims of the invention are accomplished through the utilization of a heat absorbing means 45 operable to absorb heat from the sheet and from the atmosphere adjacent those areas of the sheet which tend to be heated to higher temperatures than the remaining areas.

As noted above, the heat absorbing means 45 is constructed such that they do not interfere with the tempering procedure. To this end, the means are located in an out-of-the-way position so as not to block the blasts of air directed onto the surface of the sheet from the blast heads 41 while at the same time being effective to maintain the adjacent areas of the sheet at a lower temperature. Basically, the heat absorbing member may be constructed from any material which has heat absorbing qualities and may be in any form such as sheets, bars, rods or strips disposed in the desired positions relative to the sheets. In the preferred embodiment, a relatively heavy wire mesh is utilized since such a construction presents a larger surface area and thus more area is exposed to and operable to absorb heat from the atmosphere. The heat absorbing means 45 is carried by the rack 12 adjacent the uppermost side of the mold 11 and is positioned outwardly of the shaping rail 26 of the mold so as not to interfere with the passage of cooling air between the shaping rail and against the undersurface of the glass sheet. The member absorbs heat from the atmosphere adjacent this upper edge and thereby maintains a lower temperature in the upper regions of the glass sheet.

Herein, an elongated strip 46 of metallic mesh material is disposed above the upper shaping rail of the mold and in a plane substantially parallel to the plane of the upper rail. Thus, the strip of mesh 46 extends transversely to the plane defined by the shaping surfaces 26 of the mold 11. Preferably, the width of the mesh is such as to extend outwardly from the rack to a point beyond the shaping surface on the adjacent shaping rail. The strip 46 is carried on the rod 23 spanning the support members and fixed to the uppermost side of the mold. Herein, to support the strip 46 in the desired plane, posts 47 welded at one end to the rod 23 and projecting laterally therefrom underlie the strip and the latter is secured thereto by means such as wires 48 encircling the posts and attached to the strip.

It will be appreciated that the strip 46 lies in a plane parallel to the direction of flow of air from the nozzles 44 of the blast heads 41 and, thus, does not impede this flow in any way. This is significant since uniform tempering is not only effected by uniform heating of the glass sheet but also by uniform cooling of the sheet as it passes through the blast heads. If the flow of air against the surface of the glass sheet is impeded in any way whereby the amount of air impinging upon any area of this surface is decreased, the rate of cooling of this area would be slower than the remainder of the surface resulting in a differential in the stress pattern imparted to the sheet during the tempering process. By being located in an out-of-the-way position as described, the heat absorbing means 45 performs its intended function of promoting uniform heating of the sheet as it passes through the furnace without interfering with the other factor involved in tempering; uniform cooling of the sheet.

As noted above, in the conventional tunnel type furnace 34, the temperature increases progressively from the entrance end of the furnace and thus the leading end of the sheet is subjected to higher temperatures than the trailing end which may result in overbending the leading portions of the sheet. To overcome this disadvantage, an additional strip 49 of a heat absorbing mesh material may be mounted on the rack 12 adjacent the shaping rail 26 on the leading end of the mold 11. Here again, the strip is positioned outwardly of the mold and in a plane substantially parallel to the shaping rail at the leading end of the mold. As shown in FIG. 5, the strip 49 extends between the rods 23 carrying the mold and is secured at its opposite ends to the rods. This strip 49 functions in the same manner as the strip 46 at the top of the mold and does not interfere with the tempering procedure.

In an alternate construction, and in the event that due to the rate at which the mold is moved through the furnace sufficient heat absorption does not occur and the leading areas of the sheet become overheated, a heat absorbing member may be placed directly beneath the leading area of the glass sheet. To this end, as shown in FIG. 2, heat absorbing means 50 comprising a plurality of rods 51 spaced apart to permit substantially free passage of air from the blast heads 41 against the lower surface of the sheet are fixed to one another and to the shaping rails 26 as by welding to provide a unitary structure. The rods 51 may be arranged in any pattern suitable to absorb heat from the glass sheet and the surrounding atmosphere in the manner desired. Thus while one pattern is shown in FIG. 2, it will be appreciated that the number of rods 51 utilized to perform the heat absorbing function and their arrangement could be varied within the spirit of the invention, the main consideration being that they be spaced apart a sufficient distance to permit substantially free passage of cooling air from the nozzles 44 of the blast heads 41 to impinge upon the lower surface of the glass sheet resting on the glass mold.

It will now be apparent that a bending apparatus constructed in accordance with the present invention overcomes the problems normally encountered with the use of conventional heating and cooling equipment utilized in the production of bent and tempered glass sheets. Moreover, the present invention overcomes these problems by a simple and inexpensive construction which promotes even heating of the glass sheets which is one factor in achieving uniform bends and uniform temper in the sheet and, at the same time, is so constructed as to not interfere with the cooling or chilling of these sheets during the tempering procedure whereby all areas of the sheet are cooled at substantially the same rate which is another factor in producing uniformly tempered glass sheets.

It is to be understood that the forms of the invention herewith shown and described are to be taken as illustrative embodiments only of the same, and that various changes in the shape, size and arrangement of parts may be resorted to without departing from the spirit of the invention.

We claim:

1. In apparatus for bending and tempering glass sheets, the combination of, a ring type bending mold having shaping surfaces formed thereon and adapted to support a glass sheet in an inclined plane, and heat absorbing means disposed adjacent to but outwardly of the projected periphery of a portion of said shaping surfaces.

2. In apparatus for bending and tempering glass sheets as defined in claim 1, wherein said heat absorbing means is disposed adjacent to but outwardly of the projected periphery of the uppermost portion of said shaping surfaces.

3. In apparatus for bending and tempering glass sheets as defined in claim 1, wherein said heat absorbing means is disposed adjacent to but outwardly of the projected periphery of an inclined portion of said shaping surfaces.

4. In apparatus for bending and tempering glass sheets, the combination of a ring type bending mold having shaping surfaces formed thereon and adapted to support a glass sheet in an inclined plane, and a strip of heat absorbing material spaced outwardly of said mold and disposed in a plane extending normal to and intersecting said inclined plane.

5. In apparatus for bending and tempering glass sheets as defined in claim 4, wherein said strip is disposed adjacent the uppermost portion of said shaping surfaces.

6. In apparatus for bending and tempering glass sheets as defined in claim 5, wherein a second strip of heat absorbing material is disposed adjacent to an inclined portion of said shaping surfaces in a second plane extending normal to and intersecting said inclined plane.

7. In apparatus for bending and tempering glass sheets as defined in claim 4, wherein said strip of heat absorbing material comprises a metallic wire mesh.

8. In apparatus for bending and tempering glass sheets, the combination of, a substantially horizontal rack, a ring type bending mold carried by said rack and having shaping surfaces adapted to support a glass sheet in a plane inclined upwardly from the rack, and a strip of heat absorbing material carried by said rack outwardly of said mold, said heat absorbing member being disposed in a plane extending normal to and intersecting said inclined plane.

9. Apparatus for bending and tempering glass sheets as defined in claim 4, wherein an additional heat absorbing means comprising a plurality of spaced rods is disposed within the confines of said mold below said shaping surfaces.

References Cited by the Examiner

UNITED STATES PATENTS

| | | | |
|---|---|---|---|
| 2,348,278 | 5/1944 | Boyles et al. | 65—288 |
| 2,608,030 | 8/1952 | Jendrisak | 65—287 |
| 2,903,825 | 9/1959 | Richardson | 65—288 |
| 3,086,376 | 4/1963 | Carson et al. | 65—288 |

FOREIGN PATENTS 624,871  8/1961  Canada.

DONALL H. SYLVESTER, *Primary Examiner.*